United States Patent
Flowers

(10) Patent No.: US 6,558,555 B1
(45) Date of Patent: May 6, 2003

(54) PROCESS AND SYSTEM FOR ENHANCED PHOSPHORUS REMOVAL IN A WETLAND WASTEWATER TREATMENT FACILITY

(76) Inventor: David A. Flowers, P.O. Box 65, Cedarburg, WI (US) 53012-0065

(*) Notice: Subject to any disclaimer, the term of this patent is extended or adjusted under 35 U.S.C. 154(b) by 0 days.

(21) Appl. No.: 09/683,514

(22) Filed: Jan. 11, 2002

Related U.S. Application Data

(63) Continuation-in-part of application No. 09/681,978, filed on Jul. 3, 2001, now Pat. No. 6,447,682.

(51) Int. Cl.$^7$ .................................................. C02F 7/00
(52) U.S. Cl. ........................ 210/747; 210/805; 210/170; 210/906
(58) Field of Search ................................ 210/747, 805, 210/170, 287, 416.1, 906

(56) References Cited

U.S. PATENT DOCUMENTS

| | | | | |
|---|---|---|---|---|
| 4,915,841 A | 4/1990 | Lagana et al. | ............... | 210/605 |
| 5,078,882 A | 1/1992 | Northrop | ............... | 210/602 |
| 5,174,897 A | 12/1992 | Wengrzynek | ............... | 210/602 |
| 5,322,629 A | 6/1994 | Stewart | ............... | 210/767 |
| 5,472,472 A | 12/1995 | Northrop | ............... | 71/9 |
| 5,538,529 A | 7/1996 | Northrop | ............... | 71/9 |
| 5,690,827 A | 11/1997 | Simmering et al. | ............... | 210/602 |
| 5,755,852 A | 5/1998 | Northrop | ............... | 71/9 |
| 5,863,433 A | 1/1999 | Behrends | ............... | 210/602 |
| 5,893,975 A | 4/1999 | Eifert | ............... | 210/602 |
| 5,951,866 A | 9/1999 | Grove et al. | ............... | 210/602 |
| 5,993,649 A | 11/1999 | DeBusk et al. | ............... | 210/97 |
| 6,126,827 A | 10/2000 | Johnson, Jr. et al. | ............... | 210/602 |
| 6,159,371 A | 12/2000 | Dufay | ............... | 210/602 |
| 6,200,469 B1 | 3/2001 | Wallace | ............... | 210/150 |
| 6,277,274 B1 * | 8/2001 | Coffman | | |
| 6,302,942 B1 | 10/2001 | Ma et al. | ............... | 75/712 |
| 6,406,627 B1 * | 6/2002 | Wallace | | |

OTHER PUBLICATIONS

Pipeline, National Small Flows Clearinghouse, Summer 1998, vol. 9, no. 3.
Steiner, Gerald R. et al., *General Design, Construction, and Operation Guidelines*, Mar. 1991.
Steiner, Gerald R., et al., *General Design, Construction and Operation Guidelines, Design Manual #65*, May 1993.
McCarthy, Barbara, et al., *Development of Alternative On–Site Treatment Systems for Wastewater Treatment: A Demonstration Project for Northern Minnesota*, Dec. 31, 1997, pp. ii–14 and 29–30.
Kadlec, Robert H., et al., *Treatment Wetlands*, Chapter 13, pp. 373–442, 1996.
Zhu, T. et al., *Phosphorus Sorption and Chemical Characteristics of Lightweight Aggregates (LWA) —Potential Filter Media in Treatment Wetlands*, Wat. Sci. Tech., vol. 35, No. 5, pp. 103–108, 1997.

\* cited by examiner

*Primary Examiner*—Betsey Morrison Hoey
(74) *Attorney, Agent, or Firm*—Whyte Hirschboeck Dudek SC

(57) ABSTRACT

A process and system for enhanced phosphorus removal in a wetlands wastewater treatment facility is disclosed. A portion of the effluent is recycled back through a media which is capable of removing phosphorus from water through sorptive processes.

12 Claims, 4 Drawing Sheets

PROCESS AND SYSTEM FOR ENHANCED PHOSPHORUS REMOVAL IN A WETLAND WASTEWATER TREATMENT FACILITY

CROSS REFERENCE TO RELATED APPLICATIONS

This is a continuation-in-part of U.S. patent application Ser. No. 09/681,978 filed Jul. 3, 2001, now U.S. Pat. No. 6,447,682, issued Sep. 10, 2002.

BACKGROUND OF INVENTION

The present invention relates to a process and system for treating wastewater in a constructed wetland facility.

The use of constructed wetlands for the treatment of wastewater is becoming an increasingly popular option especially in rural or lightly developed areas. Constructed wetlands use wetland plants and bacteria to remove pollutants from the wastewater.

Phosphorus removal is a difficult task in any water treatment technology, and wetland technology is no exception. On a per unit area basis, wetlands are not efficient in phosphorus reduction. Treatment wetlands in general are area intensive compared to "conventional" technologies, and the land requirement for wetland phosphorus reduction is typically the largest of all wetland requirements.

Wetlands consist of several components: water, plants, microbiota, plant litter, and soil (or media for subsurface flow wetlands). A large number of transfer and alteration processes occur, but only soil building or sorption provides for net long-term phosphorus storage.

Phosphorus removal by harvesting biomass has not thus far proven feasible. It is difficult to harvest rooted emergent macrophytes in wetlands, and when successful, relatively tiny amounts of phosphorus have been reclaimed in the harvested biomass. One study, for example, reported an average of 2.5 percent of the total phosphorus removal in surface-flow wetlands was achieved by harvest. Floating aquatic plants are somewhat easier to harvest; over 20 percent of the total phosphorus removal was achieved by water hyacinths in another study. Harvesting is labor intensive and costly, which is antithetical to the passive character of wetlands technology. The problem of biomass utilization exacerbates the difficulties.

Because phosphorus is a nutrient, the addition of this element to the wetland stimulates growth and causes increases in the amount of biomass. Phosphorus is used not only to make the plant, it is used to make the plant bigger. This in turn generates more litter. The increase in the biomass cycle is even slower than the initial uptake; one must wait for a cohort to undergo an entire decomposition cycle, which takes many months. The increase in the pool of biomass phosphorus is a short-term process and is presumably reversible.

The two important physical processes for phosphorus removal in wetlands are sedimentation of particulate phosphorus and sorption of soluble phosphorus. Incoming particles may contain phosphorus in available and unavailable forms. If the particulate matter is planktonic, then it may subsequently decompose to release soluble phosphorus. The particles may also contain weakly sorbed phosphorus, which may subsequently desorb. But if the particles contain phosphorus as insoluble minerals or refractory organophosphorus complexes, it maybe permanently removed by the process of sedimentation.

All wetland soils have a capacity to sorb phosphorus, but that capacity is quite variable. This storage may be quickly exhausted in many surface flow treatment wetlands. In contrast, the particulate media in subsurface flow wetlands may be designed to possess a large phosphorus storage via sorption. Iron- and aluminum-rich materials, limestone media, and specially prepared clays have all been employed to enhance this removal mechanism. However, even high storage capacity soils and media will eventually be saturated with sorbed phosphorus. When the saturation point is reached, the wetland will no longer remove phosphorus and must be rebuilt which is expensive and may leave the treatment facility inoperable or inefficient for a period of time.

Therefore, a wetland wastewater treatment system that provides for long term removal of phosphorus and is easily recharged is still needed.

SUMMARY OF INVENTION

The present invention provides a process and system for enhanced nitrogen removal in a wetland wastewater treatment facility that overcomes the aforementioned problems.

In a preferred embodiment, the invention is a process for improved phosphorus removal from wastewater treated in a constructed wetland wastewater system, the process comprising the steps of: (A) providing a constructed wetland having an inlet end, an outlet end and means for recycling water from the outlet end to the inlet end, the wetlands adapted to facilitate flow of wastewater from the inlet end to the outlet end, the recycling means comprising a media capable of removing phosphorus from water through sorption processes; (B) introducing wastewater to the wetland at or proximate to the inlet end, the wastewater comprising phosphorus containing material; (C) allowing the wastewater to flow from the inlet end to the outlet end; (D) draining water from the outlet end of the wetland; (E) recycling some of the water drained from the outlet end to the inlet end of the wetland such that the recycled water contacts the media; and (F) replacing the media as needed to maintain a phosphorus content in the treated wastewater that is below a predetermined maximum.

Various other features, objects and advantages of the present invention will be made apparent from the following detailed description and the drawings.

BRIEF DESCRIPTION OF DRAWINGS

Preferred embodiments of the invention are described below with reference to the following accompanying drawings, which are for illustrative purposes only. Throughout the following views, reference numerals will be used in the drawings, and the same reference numerals will be used throughout the several views and in the description to indicate same or like parts.

In the drawings.

DETAILED DESCRIPTION

In the following detailed description, references made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention.

Figure 1:
FIG. 1 is a process flow chart of a typical prior art constructed wetland wastewater treatment system.
Figure 2:
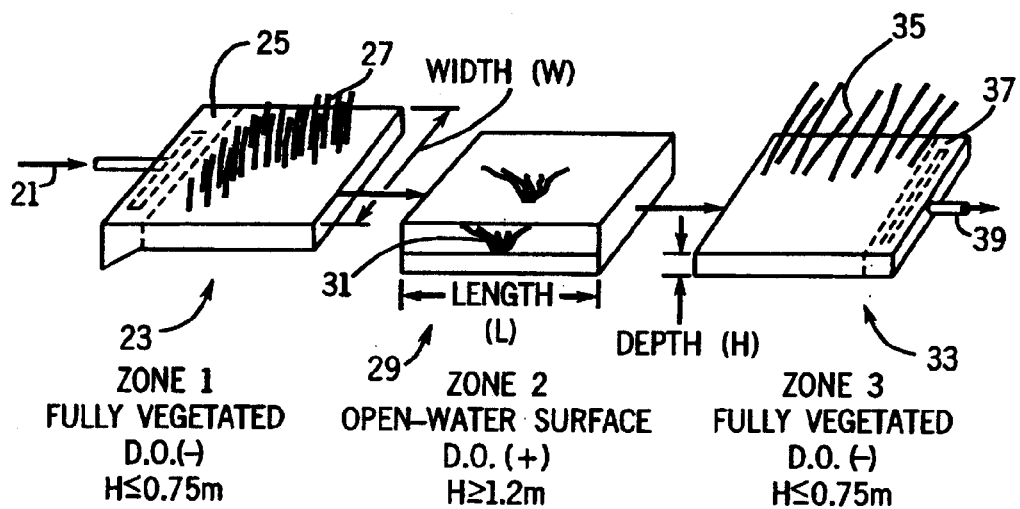
FIG. 2 is an exploded view of a typical prior art free water surface constructed wetland.
Figure 3:
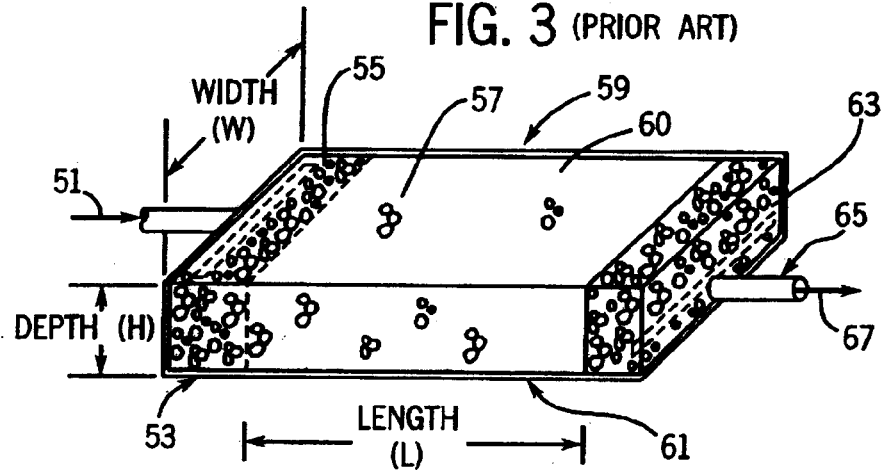
FIG. 3 is a perspective view of a typical prior art vegetated submerged bed constructed wetland.

FIG. 1 shows the process flow of a typical wastewater treatment system comprising a constructed wetland. Raw wastewater 1 goes into a primary treatment system 3 where solids may be removed by settling. Primary effluent 5 is transferred from primary treatment 3 to the constructed wetland 7, where the wastewater is treated through the wetland and exits the wetland as secondary effluent 9. The secondary effluent 9 may be disinfected or tertiary treated 11 to form the final discharge 13. Typical constructed wetlands are shown in FIGS. 2 and 3. FIG. 2 shows the elements of a free water surface constructed wetland. Influent 21 enters zone 23 of the wetland through inlet settling zone 25. The wastewater flows through floating and emergent plants 27 to reach the second zone 29. Submerged growth plants 31 in the second zone 29 provide for further treatment of the wastewater which then flows to a third zone 33. Floating and emergent plants 35 provide oxygen and phosphorus transfer for the final treatment of the wastewater which then flows into outlet zone 37 and discharges through variable level outlet 39.

FIG. 3 shows the elements of a vegetated submerged bed system. Pretreated influent 51 flows into the wetland which is contained within liner 53. The influent is distributed through the wetland in inlet zone 55. The wetland has a top slope 57 which typically is flat with no grade. The wetland also has bottom slope 61 which is generally less than or equal to 1% grade moving downward from inlet zone 55 to outlet zone 63. Treatment zone 59 is typically filled with media 60. The media 60 may be sand, gravel, rocks and plant roots. The wastewater flows through the media 60 to outlet zone 63 and from there through the variable outlet 65 the effluent 67 is discharged.

Figure 4:
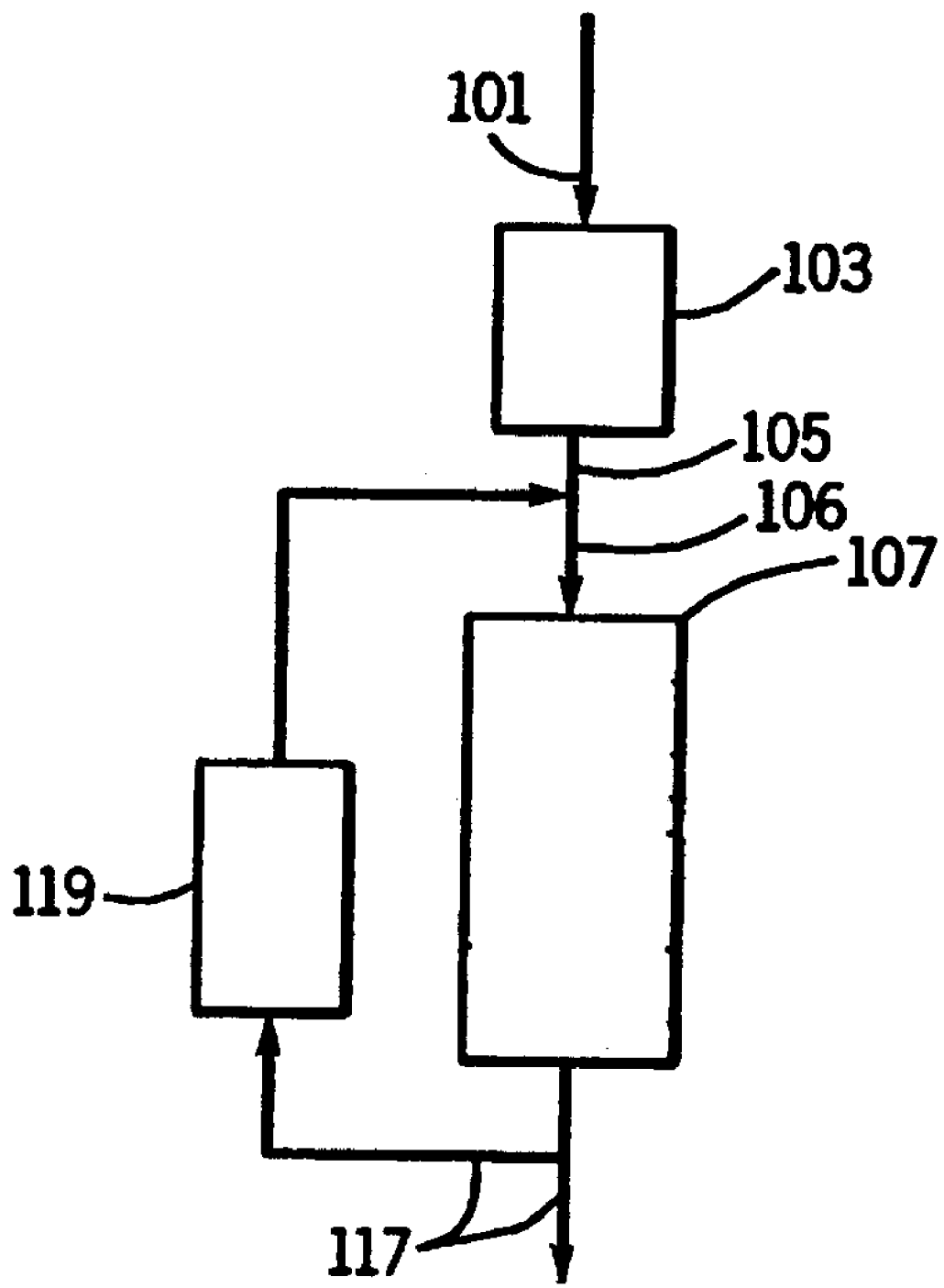
FIG. 4 is a process flow chart of the inventive constructed wetland wastewater treatment system.

The enhanced phosphorus removal process of the current invention is illustrated in FIG. 4. Raw wastewater 101 enters an optional primary treatment 103. The primary effluent 105, or, alternatively, raw wastewater 101, enters as the influent 106 to constructed wetland 107. Except as further described herein, wetland 107 may be any type of wetland known in the art, for example, the wetland of FIG. 3. Wetland 107 comprises a reservoir which is at least partially filled with water.

Figure 5:
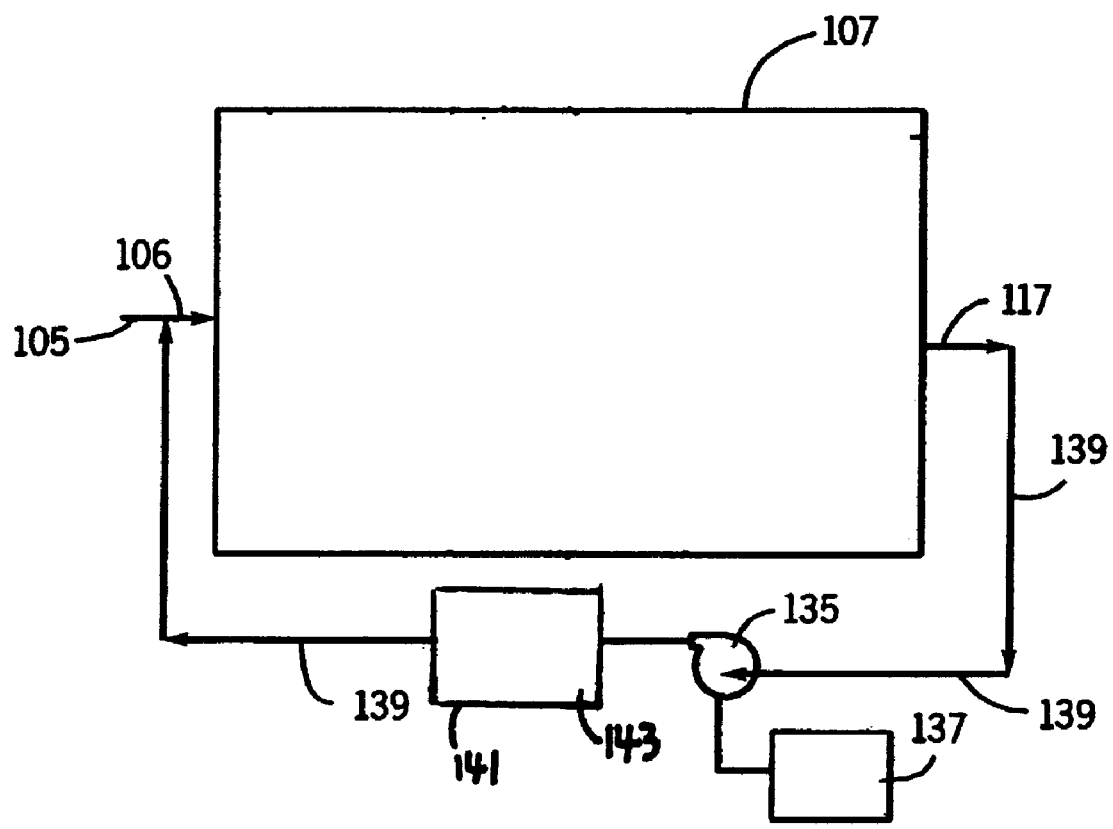
FIG. 5 is a schematic top view of the flow paths in a constructed wetland of the current invention.

Any suitable means may be used as recycle means 119. Referring now to FIG. 5, a suitable means for recycle comprises means to provide fluid communication 139 between the effluent 117 and the influent 106, means for sorbing phosphorus 141 and means to provide enough potential energy 135 to transfer effluent 117 through the means for fluid communication 139.

Means for fluid communication 139 will typically be a trench or a pipe, preferably a buried pipe, most preferably a buried PVC pipe.

Means for sorbing phosphorus 141 comprises a media 143 having the capacity to adsorb phosphorus from the recycled water. Typically, the media 143 has a large number of possible sorbing sites. A preferred media 143 comprises either an aluminum-rich low weight aggregate or an expanded clay, with the expanded clay being most preferred.

The means for sorbing phosphorus 141 is adapted to allow easy and fast replacement of saturated media 143 with fresh media 143 without physically invading or disturbing wetland 107. One such preferred adaptation for means 141 is an open top trough. The trough is typically made from concrete and the width between the sides of the trough is conveniently sized to allow a bucket, such as from a back-end loader or Bobcat, to fit in the trough with little clearance. This preferred width allows the spent media 143 to be scooped out in buckets without leaving a significant percent of residual spent media 143 in the trough.

The open top trough may be capped with a fitted cover and/or with a thin layer of soil and vegetation or left uncovered. If soil and vegetation is used, it should preferably be in a form that can be subsurface cut and rolled up (like sod). Such a form allows the material to be rolled up out from over the trough for replacement of the media and then rolled back into place when the replacement operation is done.

Means for providing potential energy 135 to enable the water to flow through the means for fluid communication 139 are well known in the art. Examples of such devices include those that develop pressure (e.g., a pump) and devices that provide potential energy by raising the elevation of the water (e.g., bucket lifts or Archimedes screws or plunger lifts). Both positive displacement pumps and pressure pumps, e.g., centrifugal pumps, are useful in the recycle means of this invention. In a preferred embodiment, the means is a centrifugal pump. Power to supply the means for providing potential energy can come from any suitable source 137 such as generators, photovoltaic cells or wind power, preferably, photovoltaic cells or a windmill.

Any practical recycle rate may be used in the practice of this invention. Higher recycle rates are more preferred in order to provide increased opportunities for the phosphorus in the water to interact with, and sorb onto, the media. Preferably, the recycle rate is at least about 50%, more preferably at least about 100% and even more preferably at least about 200% or even more. Recycle rate is defined as the amount of water recycled as a percentage of the total influent 106 flow. As one skilled in the art will readily recognize, higher recycle rates will provide more improvement in phosphorus removal than do low recycle rates. However, higher recycle rates require larger, more expensive equipment and treatment cells and have associated higher energy costs.

THEORETICAL EXAMPLE

Figure 6:
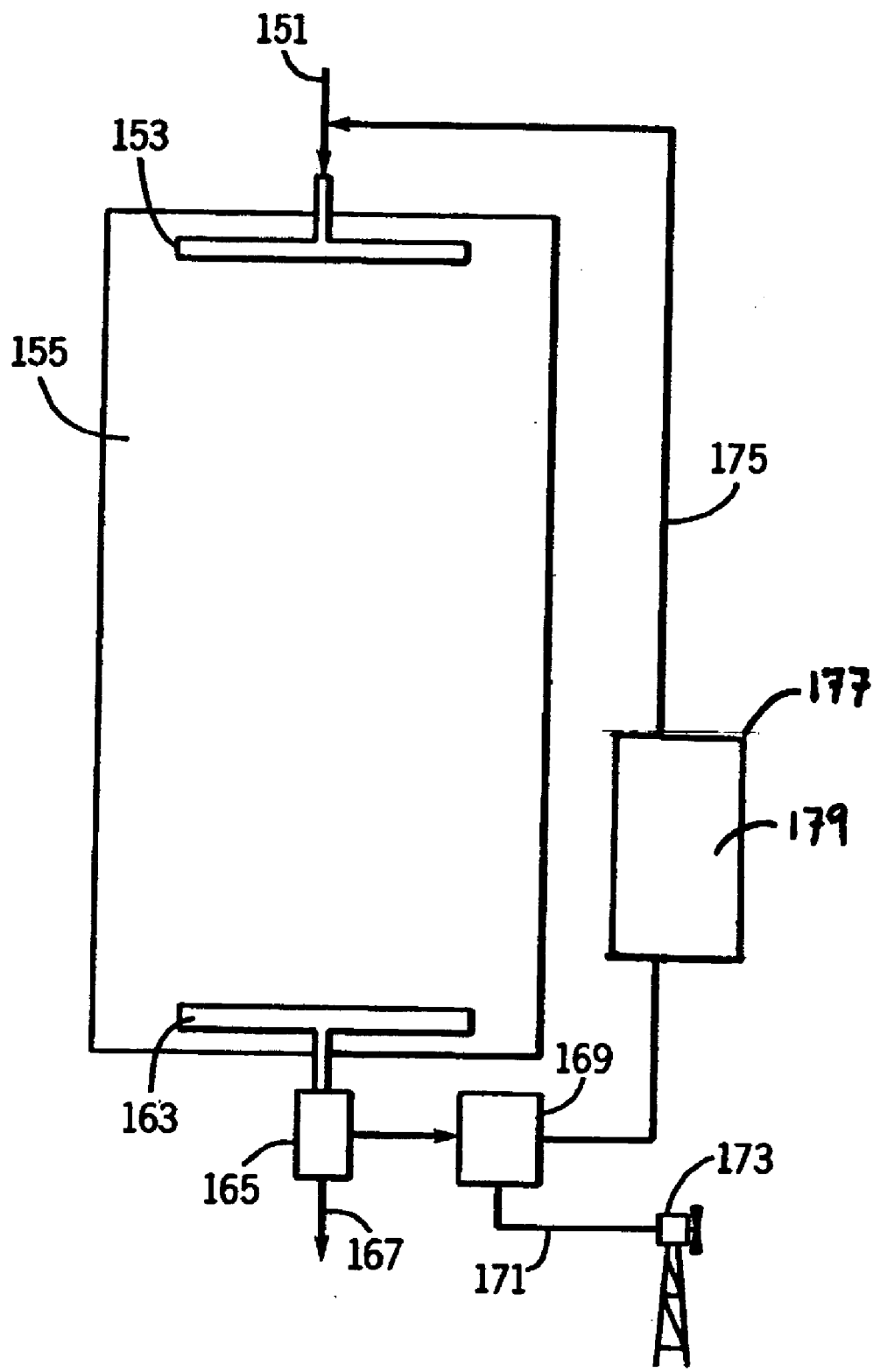
FIG. 6 is a schematic view of a preferred embodiment constructed wetland of the current invention.

A system usable for the current invention is shown in FIG. 6. Referring to FIG. 6, influent wastewater 151 enters constructed wetland 155 through inlet distribution manifold 153. Wetland 155 comprises a media of stones and cobbles (not shown).

In the unit shown, the length of wetland 155 is 60 feet. Outlet manifold 163 collects wastewater effluent 167 and delivers it to flow divider 165. Flow divider 165 is typically, and preferably, a piping tee. Effluent 167 is then discharged to either further treatment processing or to the environment. Some of effluent 167 is divided in flow divider 165 and proceeds to centrifugal pump 169. The centrifugal pump 169 may be powered by a solar array or, as shown, by wind generator 173 which produces electricity 171. Centrifugal pump 169 forces the effluent 167 through piping 175 and phosphorus sorption means 177 back to input manifold 153. Phosphorus sorption means 177 consists of a concrete trough 28 feet long and 4.3 feet wide and 3.5 feet deep. The trough is filled with a low weight aggregate 179 comprising expanded clay. A cover is fastened on top of the trough to protect the aggregate from rain or groundwater. The system is designed for recycle rates of up to about 200%.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A process for improved phosphorus removal from wastewater treated in a constructed wetland wastewater system, the process comprising the steps of:
   A) providing a constructed wetland having an inlet end, an outlet end and means for recycling water from the outlet end to the inlet end, the wetlands adapted to facilitate flow of wastewater from the inlet end to the outlet end, the recycling means comprising a media capable of removing phosphorus from water through sorption processes;
   B) introducing wastewater to the wetland at or proximate to the inlet end, the wastewater comprising phosphorus containing material;
   C) allowing the wastewater to flow from the inlet end to the outlet end;
   D) removing water from the outlet end of the wetland;
   E) recycling some of the water removed from the outlet end to the inlet end of the wetland such that the recycled water contacts the media; and
   F) replacing the media as needed to maintain a phosphorus content in the treated wastewater that is below a predetermined maximum.

2. The process of claim 1 wherein the media comprises expanded clay.

3. The process of claim 1 wherein the recycle rate is at least about 50%.

4. The process of claim 1 wherein the recycle rate is at least about 100%.

5. The process of claim 1 wherein the recycle rate is at least about 200%.

6. A constructed wetland wastewater treatment system comprising:
   A) a constructed wetland comprising a reservoir defining a flow channel for the wastewater, the wastewater at least partially filling the reservoir, the reservoir having a lower surface, an inlet end where wastewater to be treated is introduced into the reservoir and an outlet end where treated water is discharged from the reservoir, wherein the water flows from the inlet end toward the outlet end;
   B) a recycle system capable of moving treated water from the outlet end to the inlet end, the recycle system comprising a media capable of removing phosphorus from water through sorption processes.

7. The constructed wetland of claim 6 wherein the recycle system comprises a pump and piping.

8. The constructed wetland of claim 7 wherein the pump is a centrifugal pump.

9. The constructed wetland of claim 7 wherein the pump is a positive displacement pump.

10. The constructed wetland of claim 7 wherein the pump is powered by photovoltaic cells or by wind.

11. The constructed wetland of claim 6, wherein the recycle system is adapted to allow the media to be replaced without physically disturbing the reservoir.

12. The constructed wetland of claim 6, wherein the media is a light weight aggregate or expanded clay.

* * * * *